Dec. 11, 1951 G. L. BROOMELL, JR 2,577,735
CONSECUTIVE RATIO RECORDER
Filed June 18, 1949 4 Sheets-Sheet 1

Fig.1

INVENTOR.
GEORGE L. BROOMELL, JR.
BY
Woodcock and Phelan
ATTORNEYS

Dec. 11, 1951  G. L. BROOMELL, JR  2,577,735
CONSECUTIVE RATIO RECORDER
Filed June 18, 1949  4 Sheets-Sheet 2

*INVENTOR.*
GEORGE L. BROOMELL, JR.
BY
Woodcock and Phelan
ATTORNEYS

Dec. 11, 1951  G. L. BROOMELL, JR  2,577,735
CONSECUTIVE RATIO RECORDER
Filed June 18, 1949  4 Sheets-Sheet 4

INVENTOR.
GEORGE L. BROOMELL, JR
BY
Woodcock and Phelan
ATTORNEYS

Patented Dec. 11, 1951

2,577,735

UNITED STATES PATENT OFFICE 2,577,735

CONSECUTIVE RATIO RECORDER

George L. Broomell, Jr., Lower Gwynedd Township, Montgomery County, Pa., assignor to Leeds and Northrup Company, Philadelphia, Pa., a corporation of Pennsylvania Application June 18, 1949, Serial No. 99,997

14 Claims. (Cl. 250—43)

This invention relates generally to measuring, indicating, recording, or controlling electrical, physical, chemical, or other conditions; and it relates more particularly to spectroscopic measuring, indicating, recording, or controlling. It is peculiarly applicable where a plurality of continuously changing conditions are to be treated in sequence. The word "measuring" will be used generically hereinafter to include indicating, recording, or controlling.

Where an accurate comparison of two quantities is wanted ordinary errors in measurement of either may result in a relatively great comparative error. However, if the two quantities are so related that both are subject to like errors the comparison will be accurate. This principle has heretofore been recognized, but it has been difficult of application particularly where simultaneous measurement has been attempted. Simultaneous measurement of the two conditions requires duplicate apparatus which is unduly expensive and the apparatus may not function satisfactorily since differences between the two systems may result in a faulty comparison. In accordance with the invention two electrical, physical, chemical, or other conditions are measured and compared by successive operation of the same apparatus thereby effecting a true comparison. These two operations are performed in rapid succession in order that time-dependent errors may be minimized.

Particularly where a flowing stream of material is being examined and it is desired to measure an unknown condition in relation to another reference condition, it is important that a free choice of the reference condition be possible; if only a particular reference condition is available it may not be subject to the same errors as the condition being measured. The inadequacy of a comparative measurement system in which no choice of reference conditions is available will be made clear by reference to Wunsch Patent No. 1,995,594 wherein data is transmitted from a remote slidewire to a local slidewire. Provision is made for equalizing the voltages across the two slidewires, but no choice of a reference condition other than the full slidewire voltage is possible. Suppose now a portion of the remote slidewire should become shortcircuited. The consequent error would not be apparent at the local slidewire and it could not be corrected. Accordingly, it is an object of the present invention to measure and compare two conditions, one of which may be chosen arbitrarily anywhere within the scope or field of measurement of the apparatus.

Apparatus of the type herein discussed should ordinarily be capable of adjustment for operation in a wide field of measurement. For some purposes it should also be capable of adjustment for automatically measuring in sequence a plurality of conditions. In accordance with the invention such measurements are made in pairs, each unknown condition being compared to its own reference condition. Thus, a further object of the invention is to select successively certain pairs of conditions and to correlate the measurement of these conditions with their selection.

Particularly in making certain mechanical adjustments in the comparison of the aforesaid two quantities, and in cases where such adjustments must be made rapidly, sustained oscillation or hunting of the system may occur. A further object of the invention is to prevent such hunting by means which do not detract from the effectiveness of the system. This object is accomplished by suitably regulating the voltage which controls the adjustments.

The invention is particularly useful where the conditions to be measured include spectral lines of radiant energy from a spectrometer and where the degree of transmittance of these lines by a material is used to identify the constituents of the material and to measure the proportions of various constituents. These measurements may be used merely as a source of information or they may serve as a basis for controlling the proportions of the constituents.

Many substances have the characteristic of absorbing strongly radiant energy within a narrow band of wavelengths. Usually the absorption band for a particular substance differs sufficiently in wavelength from the bands of other substances so that the mere presence of the absorption band serves to identify the substance. Thus if the transmittance of a sample of an unknown substance is measured at various wavelengths and it is found to transmit well some wavelengths but to absorb, and therefore transmit poorly, a wavelength of 6.76 microns, it will be known with reasonable certainty that the substance is benzene.

It will be appreciated that this method of analysis is not easy when it is noted that a change from 6.76 microns to about 6.8 microns in the wavelength of the absorption band would have changed the indication from benzene to isohexadecane, in which case minor absorption bands would appear also at about 7.3 microns and 8.05 microns.

A very common problem in spectroscopic analysis, and the one which will be described herein as an example, is where it is known that certain constituents are present in a continuously flowing sample of material and it is desired to determine and record the relative proportions of the constituents. In addition to the above-mentioned problem of determining the wavelength of certain absorption bands with great precision, there is considerable difficulty in detecting and measuring the magnitude of the energy in the absorption band passing through the sample. Most of the energy from the source has been discarded as a result of the selection of the narrow band of wavelengths that are used so that only a small amount of energy passes through the sample to the detector. A common detecting device is a thermocouple in which temperature differences amounting to only a few millionths of a degree centigrade must be measured to achieve an accuracy of energy measurement of ½ per cent. It is apparent that absolute measurement of the transmittance of a sample would require great care to eliminate spurious temperature effects and numerous other sources of error. On the other hand, the relative transmittance of the sample at two similar wavelengths may be measured despite these errors, and such relative measurements are highly useful provided the reference wavelength is properly chosen. A further object of the invention is to measure the transmittance of a sample at a predetermined wavelength relative to the transmittance at any desired reference wavelength, and automatically to repeat this measurement so that any remaining errors may be reduced further, if desired, by averaging a large number of readings. Another object is to so measure the transmittance of a sample at a number of wavelengths, each with respect to its own reference wavelength, and to repeat the sequence of measurements automatically.

Other objects and advantages of the invention will be apparent from the following more detailed description thereof with reference to the accompanying drawings, in which.

Figure 1:
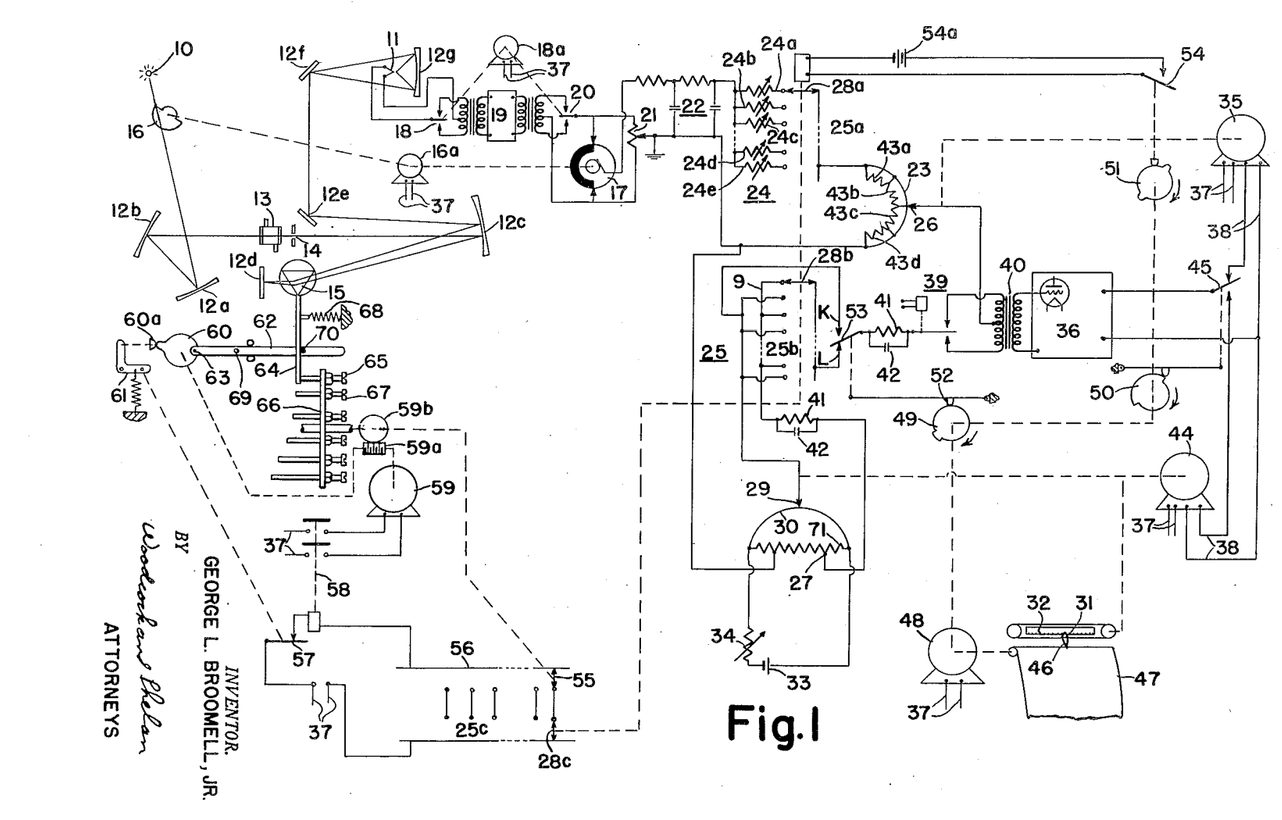
Fig. 1 is a diagrammatic representation of a spectroscopic analyzer embodying the invention.

Referring to Fig. 1, radiant energy from source 10 is directed to thermocouple 11 by mirrors 12a, 12b, 12c, 12d, 12e, 12f, and 12g through sample cell 13, slit 14, and prism 15. As is well known, the radiant energy is dispersed by prism 15 and only the energy within a certain narrow band of wavelengths is focused on thermocouple 11 by concave mirror 12g. Thus, the system including prism 15 and mirror 12g serves to select and apply to thermocouple 11 a particular wavelength and this wavelength may be varied by varying the angular position of prism 15.

Thermocouple 11 produces a voltage depending upon the temperature difference of its elements which, if there are no spurious temperature effects or other errors, is proportional to the transmittance of whatever material is in sample cell 13. Source 10 may, if desired, be a suitably heated silicon carbide rod in which case prism 15 and the transparent ends of sample cell 13 may be made of some salt such as lithium fluoride.

To eliminate or minimize certain errors due to space variation of ambient temperature at thermocouple 11, shutter 16 rotating at about 7 revolutions per second by motor 16a interrupts the flow of radiant energy in synchronism with the interruption of an electrical current by commutator 17. In order that the voltage from thermocouple 11, which may be of the order of one millionth of a bolt, may be amplified by alternating-current amplifier 19, it is reversed about 150 times per second, to give a 75-cycle voltage, by commutator 18. Commutator 20 operating in synchronism with commutator 18 from motor 18a rectifies the 75-cycle output from amplifier 19. There remains in the rectified output the 7-cycle variation introduced by the shutter 16. The rectifying or detecting action of commutator 17 is balanced by slidewire 21. Commutator 17 is synchronously driven with shutter 16 to rectify the 7-cycle output. Any remaining alternating component of voltage is removed by filter 22 so that a substantially pure D. C. voltage is applied from the above-described detector system to slidewire 23 through one of the bank of rheostats 24 and section 25a of selector switch 25. Thus, there is applied across the end terminals of slidewire 23, and therefore to contact 26, a signal voltage which depends upon the material in sample cell 13, the rotary position of prism 15, and the resistance of the particular rheostat to which contact is made by selector switch 25. If the rheostat and prism positions are fixed, then the signal voltage at contact 26 is a measure of the transmittance of the material within sample cell 13, subject to necessary errors.

Suppose, by means described hereinafter, prism 15 is positioned to provide at thermocouple 11 the wavelength which it is desired to utilize for reference purposes for subsequent measurement at a different wavelength. It is then desired to position contact 26 of slidewire 23 inversely in proportion to the voltage across slidewire 23, that is to say, it is desired to set contact 26 higher if the reference voltage applied to the whole of slidewire 23 be low, or to set it lower if the reference voltage be high. When a voltage to be measured is applied subsequently to slidewire 23, it will result in a voltage at contact 26 which is in a certain ratio to the total voltage and that ratio will be determined by the position of contact 26. In other words, a fraction of the voltage to be measured is applied to the measuring circuit, and that fraction is inversely proportional to a reference voltage.

To show an advantage of this arrangement, suppose it is used to measure the transmittance of a material at a certain wavelength, and that thereafter some dust on prism 15 or the various mirrors reduces the radiant energy at thermocouple 11 sufficiently to reduce the voltage at slidewire 23 by 10 per cent. This would mean a 10 per cent error if absolute measurements were relied upon. In accordance with the invention it would mean merely that contact 26 would be set a little higher on slidewire 23, since the dust on prism 15 would reduce the reference voltage by the same percentage that it reduced the measuring voltage, so that a larger fraction of the total slidewire voltage would appear at contact 26. By reason of the foregoing corrective action, the voltage measured at contact 26 thus would be unchanged and the dust would cause no error.

This positioning of contact 26 is accomplished by providing a servo system to move it to a fixed voltage point or, more specifically, contact 26 is moved by the servo system until the difference between its voltage and the voltage of point 27 associated with slidewire 30 is substantially zero. If a reference wavelength that produces a strong reference voltage is chosen, contact 26 will be moved to a point near ground potential, whereas if a weak reference voltage is used, contact 26 will be moved to a point far from ground potential.

An advantage of the invention is the independent adjustability of the attenuation channels provided by rheostats 24. In general, the transmittance of the material in sample cell 13 will vary widely at different wavelengths so that, without adjustment, the trace at some points, Fig. 8, might be deflected too much or too little. By adjusting rheostats 24 after determining the transmittance characteristics of the sample at various wavelengths, the most useful portion of the trace may be kept at substantially full scale at all of the wavelengths at which transmittance measurements are made.

Now suppose that, by means hereinafter described, prism 15 is rotated to a position which will result in a wavelength at thermocouple 11 at which it is desired to measure the transmittance of the material in sample cell 13. This rotation of prism 15 will be accompanied by movement of contact 28a of selector switch 25 from the first attenuation channel, rheostat 24a, to the second attenuation channel, rheostat 24b, as described hereinafter. Rheostats 24a and 24b form a pair of attenuation channels. Contact 29 of slidewire 30 is then moved to a point corresponding in voltage to that of contact 26, and pointer 31 operatively connected to contact 29 now indicates on scale 32 the transmittance of the material in sample cell 13 at the predetermined wavelength in terms of the position of contact 26. In other words, the position of contact 26 determines the fraction of the total slidewire voltage to which contact 29 is adjusted.

Slidewire 30, and consequently point 27, is supplied with substantially constant voltage from battery 33 adjustable by rheostat 34. However, the voltage from battery 33 is not critical and it may vary over a considerable range provided its variation is slow enough so that the change between calibrations is negligible.

Figure 2:
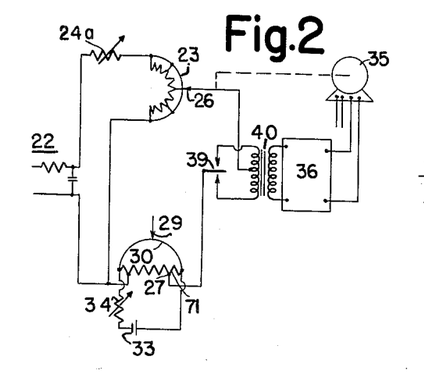
Figs. 2, 3, 4, 5, 6, and 7 are simplified fragmentary schematic views of a portion of the analyzer shown in Fig. 1, each illustrating the operative connections of certain parts for differing positions of the switching arrangement.

From the foregoing description it will now be apparent that there is first established a balanceable network (Fig. 2) in which the reference signal voltage from filter 22 produced by the detector-amplifier arrangement is balanced by the adjustment of contact 26 of slidewire 23, the balanceable network being supplied with a fixed voltage from battery 33. After balance of this network and a predetermined time interval the circuit connections are changed by timing switch means to establish a second balanceable network, also supplied by the battery 33, to which there is applied through the same filter 22 the voltage to be measured. In this case the contact 26 of slidewire 23 remains stationary, its adjustment having been completed for establishment in the second balanceable network of a reference condition for the measurement of the unknown voltage. In the second network (Fig. 5) the second motor 44 adjusts contact 29 with respect to slidewire 30 and at the same time drives the pen or indicator relative to the associated scale or chart to provide a record and indication of the magnitude of the unknown voltage under measurement.

The servo system which adjusts contact 26 comprises motor 35, amplifier 36 and accessory apparatus. Motor 35 may be a two-phase induction motor, one of its phases being supplied by any suitable alternating-current supply lines 37, and phase 38 being supplied by amplifier 36. The D.-C. voltage between contact 26 and point 27 is converted to alternating current in vibrator 39 for amplification in transformer 40 and amplifier 36 as described in the prior patent to Williams, No. 2,113,164. Resistors 41 and capacitors 42 to stabilize the servo system by what is commonly known as derivative control, and resistors 43a, 43b, 43c and 43d tend further to stabilize the servo system by equalizing its sensitivity throughout the range of slidewire 23.

The voltage between contact 26 and point 27, through a switching system to be described hereinafter, a constitutes a servo error voltage which the servo system reduces to zero by movement of contact 26. From the servo system standpoint slidewire 23 may be regarded as a voltage pickoff device and any other suitable well-known pickoff device may be employed.

When contact 29 is to be adjusted, main servomotor 44 is substituted for calibrating servomotor 35 by switch 45. Motor 44 also drives pointer 31 and pen 46 which records on record chart 47 the posititon of contact 29. Slidewire 30 may appropriately be called a main or recording slidewire, while slidewire 23 may be called a calibrating slidewire. Record chart 47 is moved continuously by timing motor 48 which may be a single-phase synchronous motor operated from power line 37. Motor 48 also drives continuously a cam system, including shifter cam 49, motor selector cam 50, and cycle-control selector cam 51, or equivalent means for operating timing switch means or devices. Cam 50 throws motor selector switch 45 to connect amplifier 36 to either motor 35 or motor 44.

Cam 49 lifts follower 52 to move shifter switch contact 53 from point L to point K, thereby shifting the part of the circuit to which contact 26 is connected from point 27 to contact 29 of slidewire 30 if contact 28b of selector switch 25 is connected to conductor 9, in which positions of contact 28b prism 15 is positioned by means hereinafter described to produce at thermocouple 11 one of those wavelengths which it is desired to use as reference wavelengths. If contact 28b is in one of the alternate positions, connected to contact 29, in which position prism 15 will be positioned to produce at thermocouple 11 one of the wavelengths at which the transmittance of the material in sample cell 13 is to be measured, movement of follower 52 to move shifter switch contact 53 will have no effect.

After contact 26 has been adjusted to make its voltage equal to that of point 27, the position of contact 26 being determined by the transmittance of the material in sample cell 13 at a reference wavelength, and cam 50 has thrown motor selector switch 45 to transfer amplifier 36 from motor 35 to 44, cam 49 transfers the servo input from point 27 to contact 29 whereupon contact 29 is moved by the servo system until its voltage is equal to that of contact 26. Inasmuch as the voltage at contact 26 previously was adjusted to equal that at point 27, and since this adjustment has not been disturbed, contact 29 is moved to a point whose voltage is equal to that of point 27. This will place pointer 31 at what may be regarded as its full-scale position. Next, cam 51 closes cycle-control selector switch 54 to cause selector switch 25 to move to a new position in which a wavelength is produced at which it is desired to measure the transmittance of the contents of sample cell 13, this new wavelength resulting in a different voltage at contact 26, thus unbalancing the system and causing contact 29 to be readjusted to measure and record the transmittance.

Having thus measured and recorded the transmittance of the material in sample cell 13 at one predetermined wavelength, after a predetermined time interval, cam 51 then closes momentarily switch 54 causing selector switch 25 to move to another position in which contact 28a is connected to rheostat 24c. This movement of selector switch 25 produces three results.

First, by manual adjustment of rheostats 24 the independent adjustment of the attenuation of the voltage originating in thermocouple 11 is possible to compensate for strong or weak transmittance of the material in sample cell 13 at the particular wavelength applied thereto. In addition to advantages already described, substantially the full range of slidewire 23 may thus be utilized. If, with a strong reference signal, contact 26 were adjusted near the low-voltage end of slidewire 23, inaccuracies might occur, since slidewire 23 may be of a wound construction that may be adjusted only in discrete steps, and one of these steps might be a large part of the remaining resistance thus precluding a fine adjustment. It will be understood that either the contacts or the bodies of the slidewire described herein may be movable.

Second, in section 25b of selector switch 25 contact 28b is moved to a position which permits cam 49 to transfer the servo input circuit from contact 29 to point 27 in readiness for the readjustment of contact 26 by motor 35 which has been connected to amplifier 36 by cam 50 and switch 45.

Third, contact 28c of section 25c of selector switch 25 moves to open the circuit which includes contact 55 of positioning switch 56 and limit switch 57, thereby allowing relay 58 to resume its normally closed position to connect motor 59 to power lines 37, thereby to rotate prism 15 to a predetermined position which will result in the next desired reference wavelength at thermocouple 11.

The rotation of prism motor 59 also ultimately moves contact 55 of sequence switch 56 to a position opposite contact 28c, and it closes limit switch 57, thereby completing the power circuit to relay 58 to open the relay and stop motor 59. In the meantime, prism 15, Figs. 1 and 9, has been positioned as follows: cam 60 is driven by motor 59 to actuate limit switch 57 operatively connected to bell-crank 61 or an equivalent mechanical or electrical linkage. Connecting rod 62 eccentrically connected to cam 60 by pin 63 lifts lever 64 from stop 65 and maintains it in a lifted position throughout a portion of a revolution of cam 60. While lever 64 is so lifted, motor 59 rotates turret 66 until another stop 67 is under lever 64, whereupon spring 68 holds lever 64 against stop 67 during the other portion of a revolution of cam 60. Cam 60 is rotated one revolution while turret 66 moves the distance between two stops by any suitable well-known gearing, such as worm 59a meshing with gear 59b.

Figure 9:
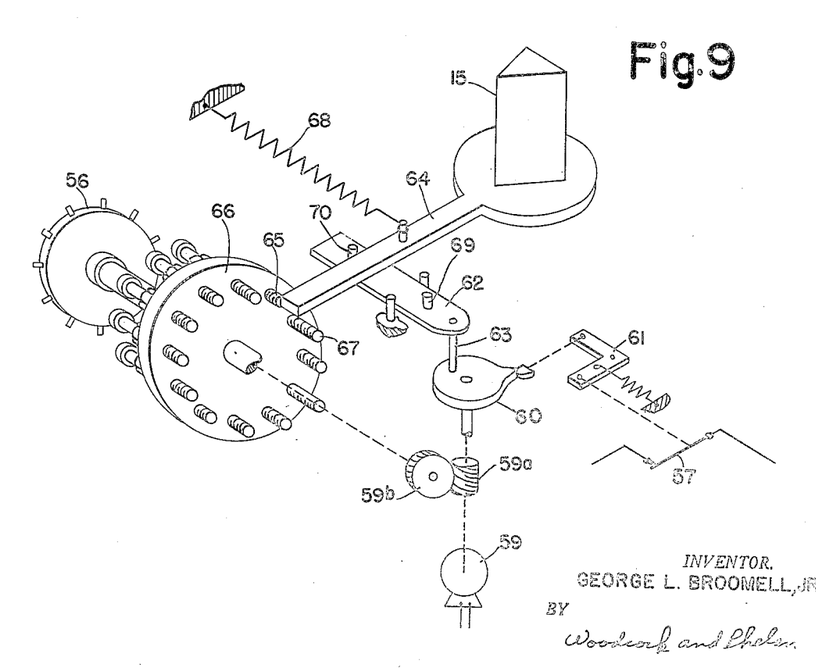
Fig. 9 is an enlarged fragmentary perspective view of a portion of the apparatus shown in Fig. 1.

Pin 63 is sufficiently eccentric on cam 60 to lift lever 64 more than enough to clear the longest stop on turret 66, the excess movement of connecting rod 62 being accommodated by its free movement along lever 64 between pins 69 and 70. Each of the stops on turret 66 is threaded therein for adjustably positioning lever 64 and prism 15, attached thereto, so that adjustment of any stop assures that, during the time it positions lever 64, prism 15 will be positioned to produce at thermocouple 11 an accurately predetermined wavelength.

It will now be apparent that movement of contact 28c of selector switch 25 to a new position will result in the selection of a new wavelength by precisely positioning prism 15 carried by lever 64, the lever being held firmly against a precisely adjusted stop, while the prism drive motor 59 is stopped at only a roughly predetermined position by closing of limit switch 57 and the movement to a new position of contact 55 of positioning switch 56, the new position of contact 55 corresponding to the new position of contact 28c thereby assuring that the correct one of several predetermined wavelengths is produced.

Switches 25 and 56 may be of any suitable well-known type, and they may be circular in configuration with each switch position corresponding to a stop on turret 66. Switch 25 may be operated directly from timing motor 44 and cam 51, if desired, instead of switch 54 and battery 54a.

In the preferred form of the invention, the recording mechanism is preferably of the multiple-point printwheel type, such as shown in Ross and Seberhagen Patent No. 2,113,748. The first recorded point will be the one indicating that the system has been calibrated in accordance with a reference voltage representative of the transmittance at a selected reference wavelength, and the next recorded point will be indicative of the value of the unknown voltage representative of the transmittance at a selected measuring wavelength in relation to this reference voltage; i. e., the ratio of one to the other. However, for a more detailed explanation of the present invention, an idealized trace has been shown in Fig. 8, such as might be made with the pen 46 continuously in engagement with the record chart 47 and with straight-line movement of the pen. Hence, the idealized trace of Fig. 8 can be utilized in the present description both as a timing diagram and as a measurement record of one transmittance with reference to the other.

In Figs. 2–7 the circuit of Fig. 1 has been shown with certain switches omitted for clearness, each figure representing a different switching position. The circuit connections of Fig. 2, wherein contact 26 is positioned in accordance with the transmittance of the material in sample cell 13 at a reference wavelength, are maintained during the time interval between points A and B of Fig. 8. With contact 53, Fig. 1, in contact with point L and selector switch 25 positioned to receive a signal through rheostat 24a, it will be apparent that contact 29 is not connected to any other circuit element and that the servo error voltage is the voltage between contact 26 and point 27. Cams 49, 50, and 51 are in the positions shown in Fig. 1.

Figure 3:
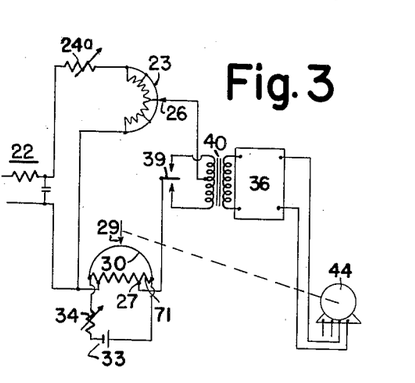

At point B the circuit connections change to those shown in Fig. 3 wherein cam 50 has been operated to connect motor 44, instead of motor 35, to amplifier 36. However, motor 44 will not operate in this condition since no change has been made in the servo error voltage, which remains at zero. Pen 46 will remain in its previous position as indicated by the trace between points A and B in Fig. 8, thus extending the trace from point B to point C.

Figure 4:
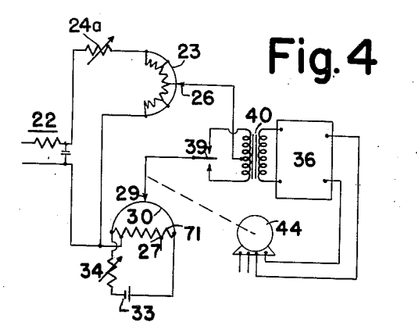

At point C the circuit connections change to those of Fig. 4 wherein cam 49 has operated to throw contact 53 from point L to point K, thereby shifting the servo input circuit from point 27 to contact 29. Motor 44 moves contact 29 to a point whose voltage is equal to that of contact 26, and pen 46 moves with contact 29 to point D, Fig. 8, where it remains during the time interval between D and E. Since contact 26 remains at the same voltage as point 27, contact 29 will now be set at a point whose voltage is the same as that at point 27. The voltage at point 27 is somewhat less than the full voltage of slidewire 30, determined by resistor 71, in order that contact 29 may move to a slightly higher voltage position, as it may do if the setting of contact 26 is in error. Since rheostats 24 ordinarily are so adjusted that the voltage applied to slidewire 23 with measuring wavelengths will not exceed the voltage with reference wavelengths, contact 29 usually will be at a voltage less than that of point 27 and, therefore, resistor 71 is so chosen that pen 46 is nearer one edge of the record chart 47, making a trace like that shown between points D and E in Fig. 8 with the circuit arrangement shown in Fig. 4. The straight line between D and E shows that the adjustment of contact 26 relative to slidewire 23 has been completed and visually indicates the measuring system is in readiness to measure the transmittance at the measuring wavelength.

Figure 5:
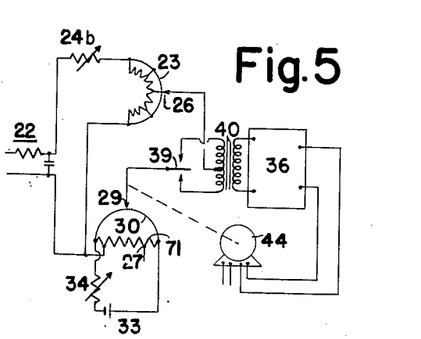
Figure 8:
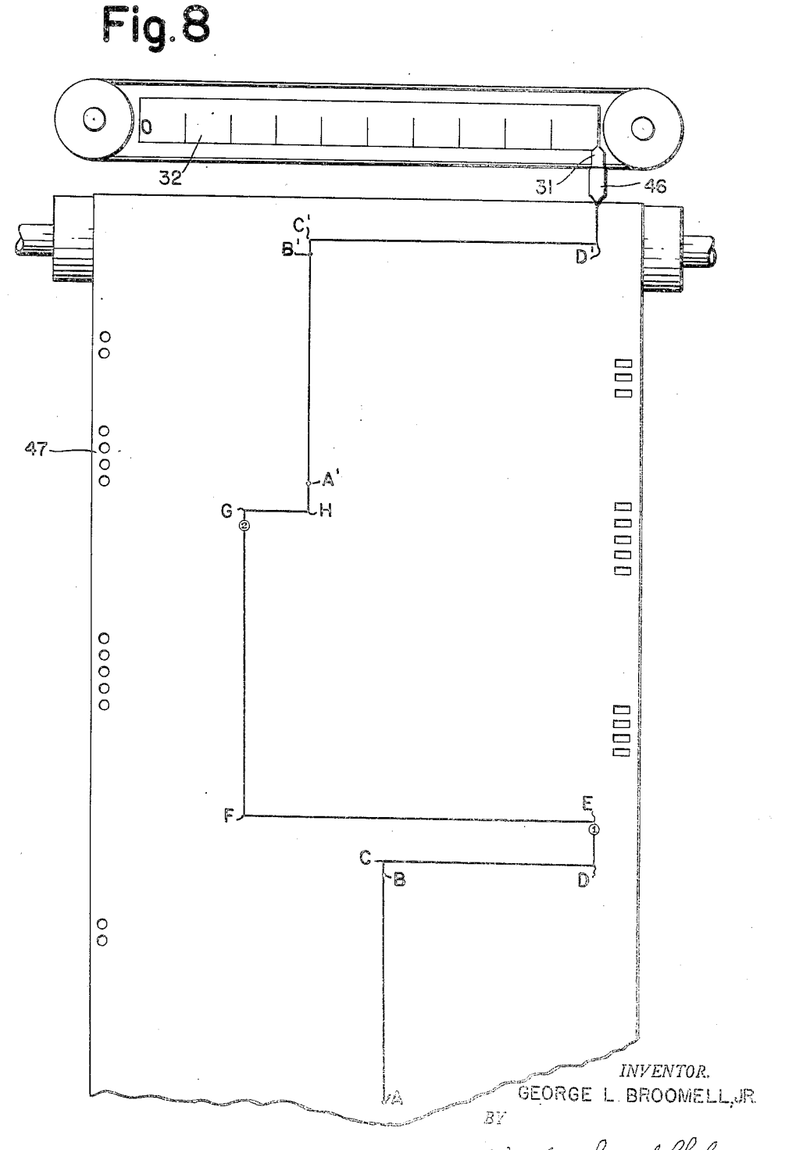
Fig. 8 is a fragmentary diagrammatic view of a hypothetical recorder chart used to explain the operation of the invention.

At point E the circuit connections change to those of Fig. 5, wherein cam 51 and switch 54 have actuated selector switch 25 to move its contact 28 to rheostat 24b and to rotate prism 15 to a position determined by another stop, thereby producing at thermocouple 11 a wavelength at which it is desired to measure the transmittance of the material in sample cell 13. Inasmuch as this transmittance will differ from that at the previously used wavelengths, and since rheostat 24b may have a different resistance from rheostat 24a, the voltage applied to slidewire 23, and therefore the voltage at contact 26, will now be different from the voltage at contact 29, thus unbalancing the system and providing a servo error voltage that will cause motor 44 to rotate contact 29 to rebalance it by making the voltage at contact 29 equal to the voltage at contact 26. Pen 46 is thereby driven to point F on the chart to record the measurement of the transmittance at the measuring wavelength in terms of the transmittance at the reference wavelength. As shown in Fig. 8, the pen remains for an interval of time in its last-named position. Thus, it will be seen adequate time is provided for a balancing and printing operation during the time between points D and E and between the points F and G. Such printed points "1" and "2" have been shown within the small circles. At point G, the circuit connections at the latter point change from those of Fig. 5 to those of Fig. 6.

Figure 6:
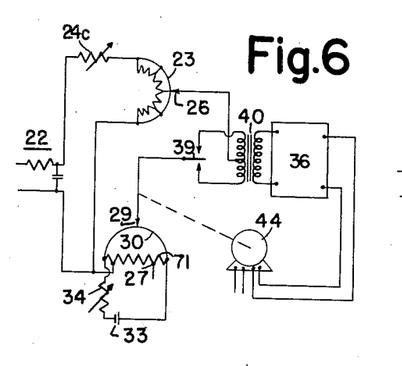

In Fig. 6, cam 51 and switch 54 have caused selector switch 25 to move its contact 28 to make contact with rheostat 24c and to set prism 15 to produce a new reference wavelength at thermocouple 11. Due to the different transmittance of the material in sample cell 13 at the new reference wavelength, and because of the different resistance of rheostat 24c, the voltage at contact 26 will be different, thereby unbalancing the servo system and causing contact 29 to move to a new position such as that recorded between points H and A' of Fig. 8. As a matter of transition, when the circuit connections change from Fig. 5 to those of Fig. 6, it will be observed that the transmittance at the new reference wavelength will be measured in terms of the preceding reference quantity, this operation appearing on the trace between the points H and A', as mentioned.

Figure 7:
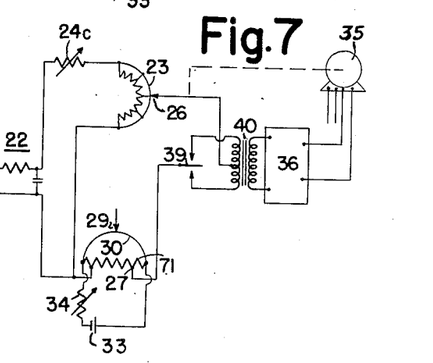

At the point A' the connections change to those of Fig. 7 and a new cycle is initiated. In Fig. 7 cam 49 has operated to shift the servo input circuit from contact 29 to point 27, this being the same circuit arrangement shown in Fig. 2, except that the first of a different pair of attenuation channels 24c, is utilized instead of 24a and a different reference wavelength has been produced. The other channel of this pair is provided by rheostat 24d. In this circuit arrangement contact 26 will be readjusted, and pen 46 remains stationary since motor 44 is now inoperative, cam 50 and switch 45 having connected motor 35 to amplifier 36.

Reference is again made to the fact that with the multiple-point recorder, printing does not occur except at a point during the intervals between D and E and a point between F and G, and that for successive measurements of a plurality of quantities, each in relation to its own reference quantity, the reference points may be designated as odd numbers such as "1," and the measured points designated by even numbers such as "2."

There has been described a system wherein a slidewire is frequently adjusted to make the voltage of its contact 26 equal to a fixed voltage, that of point 27, by a servo system. It is well known that servo systems that respond quickly and accurately to unbalance, or error, voltages tend to be unstable and numerous antihunt devices have been proposed for their stabilization. None of these devices by themselves have been satisfactory in the measuring system of the invention because of the following circumstance. The voltage applied to slidewire 23 is subject to wide variation depending upon the transmittance of the material in sample cell 13 and the adjustment of rheostats 24. Accordingly, the current through slidewire 23 varies widely and, therefore, if the slidewire be linear, there will be wide variation in the effect on the error voltage of a small movement of contact 26, such as will occur as the servo system approaches a balanced condition.

If the voltage applied to slidewire 23 be high so that contact 26 balances near the lower end of the slidewire, a given movement of contact 26 will cause a change in its voltage that is relatively great because of the relatively great current in the slidewire. On the other hand, if the voltage applied to slidewire 23 be low, its current will be low and the same movement of contact 26, balancing high up on the slidewire, will cause relatively little effect on the error voltage.

Antihunt devices heretofore known, such as the derivative control circuits including resistors 41 and capacitors 42, will be fully effective only if the pickoff sensitivity is substantially constant over the range of operation of the pickoff device; that is to say, a given movement of contact 26, or other pickoff element, must produce substantially the same change in its voltage whether the current through the slidewire be high so that the contact is low down on the slidewire when its voltage equals the fixed voltage, or whether the slidewire current be low so that the contact balances high up on the slidewire. It is deemed preferable to make a relatively simple provision in the system that will render existing, well-known antihunt devices effective therein, rather than to provide a wholly new antihunt device.

Stated mathematically the requirement is that $$\frac{de}{dx} = K \quad (A)$$

where $d$ represents differentiation, $e$ the voltage of the contact, $x$ the linear or angular position of the contact, and $K$ is an arbitrary constant. Since the variations that are of interest are small compared to $e$ itself, $e$ may be regarded as a constant and the foregoing equation written as $$\frac{de}{e} = K\,dx \quad (B)$$

By the nature of the problem, the current $i$ through the slidewire is constant during the time the contact is being adjusted so that $$e = ir \quad (C)$$

and $$\frac{de}{dr} = i \quad (D)$$

where $r$ is the resistance of the slidewire up to the contact. Substituting Equation D in Equation C $$e = r\frac{de}{dr} \text{ or } \frac{dr}{r} = \frac{de}{e} \quad (E)$$

Substituting Equation E in Equation B, the requirement becomes $$\frac{dr}{r} = K\,dx \quad (F)$$

This requirement will be met if the slidewire is so designed that $$x = \frac{\log r}{K} \quad (G)$$

That this is so can be shown by differentiating Equation G with respect to $r$.

$$\frac{dx}{dr} = \frac{1}{Kr} \text{ or } \frac{dr}{r} = K\,dx \quad (H)$$

which is identical to Equation F. A slidewire designed so that the position of its contact is proportional to the logarithm of the resistance of the slidewire up to the contact, in accordance with Equation G, is referred to herein for convenience as a logarithmically tapered slidewire.

Figure 10:
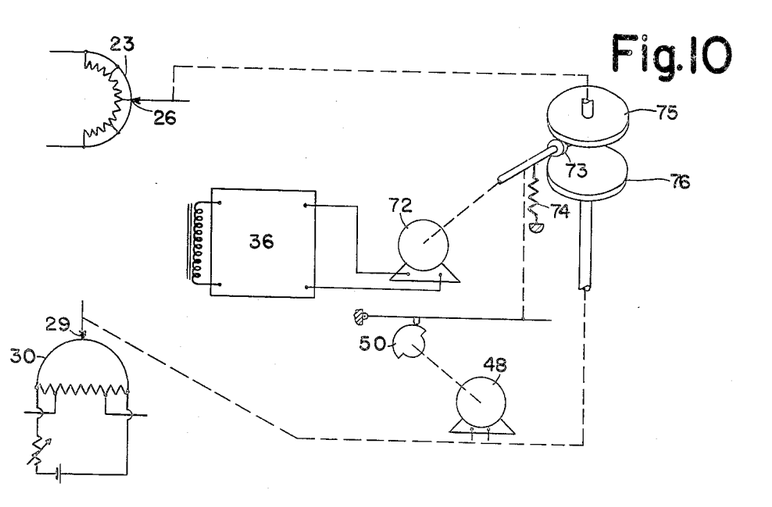
Fig. 10 is a fragmentary diagrammatic view of a modification of the structure shown in Fig. 1.

There has been described an analyzer system with a switch 45 for connecting either of two motors 35 or 44 to amplifier 36 to perform two different functions. In Fig. 10 a modification of this arrangement is shown in which a single servomotor 72 permanently connected to amplifier 36 is caused to perform similar functions when cam 50 moves rotor 73 against the tension of spring 74 to rotate by frictional contact disc 75 which is connected to contact 26. In this position servomotor 72 moves contact 26 in the same way that servomotor 35 moves contact 26 in the modification shown in Fig. 1. In the other position of cam 50 spring 74 holds rotor 73 against disc 76 to drive contact 29, pointer 31, and pen 46. In this position servomotor 72 adjusts contact 29 in the same way that servomotor 44 adjusts contact 29 in the arrangement shown in Fig. 1.

While preferred embodiments of the invention have been shown, it will be understood that modifications thereof may be made within the spirit and scope of the invention as set forth in the appended claims.

What is claimed is:

1. A measuring system comprising a balanceable network including a calibration slidewire and a main slidewire, circuit-controlling means for applying to said network a signal varying in accordance with the magnitude of an arbitrarily selected reference condition for unbalancing said network, means responsive to the unbalance of said network for adjusting said calibration slidewire in a direction and to an extent sufficient to rebalance the network, said unbalance-responsive means being connected between the movable contact of said calibration slidewire and a fixed voltage point, said circuit-controlling means being operable after the rebalancing of said network to apply to said network a signal varying with the magnitude of a different condition and to connect said unbalance-responsive means between said movable contact of said calibration slidewire and the movable contact of said main slidewire for adjustment of said main slidewire in the direction and to an extent sufficient to equalize the voltages at said movable contacts of said slidewires to rebalance said network thereby to provide a measurement of the magnitude of said second-named condition with respect to the magnitude of said first-named condition.

2. The combination set forth in claim 1 in which said circuit-controlling means is operable from one position to another after a predetermined time interval in each position thereof, and means under the control of said circuit-controlling means for controlling the application of said signals from said two conditions to said network in timed relation with the operation thereof.

3. The combination set forth in claim 1 in which the conditions under measurement are spectral lines of a spectrometer and in which there is provided means operable in timed relation with said circuit-controlling means for scanning predetermined spectral lines as standards and for alternately scanning lines for determination of the intensity of each with respect to one of said spectral lines selected as standards.

4. In apparatus for measuring the transmittance of a sample at a predetermined wavelength in relation to the transmittance of said sample at an arbitrarily selected reference wavelength, the combination which comprises a spectroscopic analyzer for producing a voltage substantially proportional to the transmittance of said sample at any operating wavelength of said analyzer, said analyzer being operable at various predetermined wavelengths, a balanceable network including a calibration slidewire, a main slidewire, a selector switch and servo system for adjusting said calibration slidewire relative to its contact in accordance with the difference between a fixed voltage and said analyzer voltage at a reference wavelength and without further adjustment of said calibration slidewire thereafter adjusting said main slidewire relative to its contact in accordance with the unbalance of said network resulting from application thereto of said analyzer voltage corresponding with said predetermined wavelength to equalize the voltages at said slidewire contacts, and timing switch means operatively connected to said servo system, selector switch, and analyzer for controlling the sequential selection and utilization of certain predetermined wavelengths.

5. In apparatus for measuring and comparing predetermined quantities in relation to arbitrarily selected reference quantities having similar characteristics and being subject to similar measuring errors, the combination of a detector system for producing a voltage substantially proportional to any one of various predetermined quantities, and a measuring system comprising a balanceable network including a calibration slidewire, a main slidewire, a selector switch and servo system for adjusting the contact voltage of said calibration slidewire in accordance with the relation between a fixed voltage and said contact voltage for a selected one of said reference quantities and thereafter adjusting said main slidewire to balance its contact voltage and the voltage at the contact of said calibration slidewire for a selected one of said predetermined quantities, and timing switch means operatively connected to said servo system, selector switch, and measuring system thereby to control the sequential selection and utilization of certain of said predetermined quantities.

6. A measuring system comprising a balanceable network including a calibration slidewire, a main slidewire, an indicator operatively connected to said main slidewire, a selector switch for applying to said network a signal varying in accordance with the magnitude of an arbitrarily selected reference condition for unbalancing said network, a servo system responsive to the unbalance of said network for adjusting said calibration slidewire in a direction and to an extent sufficient to rebalance said network, said servo system being connected between the movable contact of said calibration slidewire and a point of said network corresponding in voltage to a fixed point on said main slidewire, said selector switch being operable after rebalance of said network to apply to said network a signal varying with the magnitude of a different condition, and timing switch means to connect said servo system between said calibration slidewire and said main slidewire for adjustment of said main slidewire in a direction and to an extent sufficient to equalize the contact voltages of said slidewire to rebalance said network thereby to provide a measurement of the magnitude of said second-named condition with respect to the magnitude of said first-named condition in avoidance of measuring errors common to both conditions.

7. The combination set forth in claim 6 in which said selector switch is operable automatically from one position to another after a predetermined time interval in each position thereof, a section of said selector switch being adapted and arranged for controlling the application of said signals from said two conditions to said network in timed relation with the operation thereof.

8. The combination set forth in claim 6 in which the conditions under measurement are spectral lines of a spectrometer and in which there is provided spectrum scanning means operable in timed relation with said selector switch for scanning predetermined spectral lines as standards and for subsequently and alternately scanning spectral lines for determination of the intensity of each with respect to one of said spectral lines selected as standards.

9. The combination set forth in claim 6 in which the conditions under measurement are spectral lines of a spectrometer and in which there is provided spectrum scanning means operable in timed relation with said selector switch for scanning predetermined spectral lines as standards and for alternately scanning lines for determination of the intensity of each with respect to one of said spectral lines selected as standards.

10. In a spectroscopic analyzer having a sample cell adapted and arranged to expose the contents thereof to radiant energy from a source having a spectrum of substantial width, a spectroscope for selecting by the position of one of its members the portion of said spectrum to which said contents are exposed, and a detector-amplifier having a voltage output substantially proportional to the transmittance of said contents at the portion of said spectrum selected by said spectroscope, the combination therewith of a balanceable network including a calibration slidewire, a main slidewire, and an indicator operatively connected to said main slidewire, a selector switch for applying to said network said voltage output to unbalance said network, a servo system responsive to the unbalance of said network for adjusting said calibration slidewire in a direction and to an extent sufficient to rebalance said network, said servo system initially being connected to and controlled by the voltage between the movable contact of said calibration slidewire and a fixed point on said main slidewire, said selector switch being operable after rebalance of said network to apply to said network the voltage output of said amplifier at a different portion of said spectrum, and timing switch means to connect said servo system between the movable contacts of said calibration slidewire and said main slidewire for adjustment of said main slidewire in the direction and to an extent sufficient to rebalance said network thereby to measure the transmittance of said contents at said second-named portion of said spectrum in relation to the transmittance of said contents at said first-named portion of said spectrum in avoidance of measuring errors common to measurement of the transmittance at both said portions of said spectrum.

11. In a spectroscopic analyzer having a sample cell adapted and arranged to expose the contents thereof to radiant energy from a source having a spectrum of substantial width, a spectroscope for selecting by the position of one of its members the portion of said spectrum to which said contents are exposed, and a detector-amplifier having a voltage output substantially proportional to the transmittance of said contents at the portion of said spectrum selected by said spectroscope, the combination therewith of a balanceable network including a calibration slidewire, a main slidewire, and an indicator operatively connected to said main slidewire, a selector switch for applying to said network said voltage output to unbalance said network, a servo system responsive to the unbalance of said network for adjusting said calibration slidewire in a direction and to an extent sufficient to rebalance said network, said servo system initially being connected to and controlled by the voltage between the movable contact of said calibration slidewire and a fixed point on said main slidewire, said selector switch being operable after rebalance of said network to apply to said network the voltage output of said amplifier at a different portion of said spectrum, and timing switches to connect said servo system between the movable contacts of said calibration slidewire and said main slidewire for adjustment of said main slidewire in the direction and to an extent sufficient to rebalance said network, said spectroscope, selector switch, and timing switches being interconnected to operate successively in predetermined time relation thereby to measure the transmittance of said contents at certain portions of said spectrum in relation to the transmittance of said contents at certain different portions of said spectrum in avoidance of measuring errors common to measurement of the transmittance of said contents at all said portions of said spectrum.

12. In a spectroscopic analyzer having a sample cell adapted and arranged to expose any contents thereof to radiant energy from a source having a spectrum of substantial width, a spectroscope for selecting by the position of one of its members the portion of said spectrum to which said contents are exposed, a detector-amplifier having a voltage output substantially proportional to the transmittance of said contents at the portion of said spectrum selected by said spectroscope, and a plurality of pairs of independently adjustable attenuation channels the combination therewith of a calibrating slidewire having a relatively movable voltage contact, a selector switch for connecting said voltage output through a selected one of said channels across said slidewire, a calibrating servomotor for moving said slidewire relative to said contact, an indicator, a main slidewire having a relatively movable voltage contact, a main servomotor for moving said indicator and said main slidewire relative to said last-mentioned contact, a timing motor and a cam system driven thereby, said cam system comprising a motor cam, a shifter cam, and a selector cam for actuating said selector switch, a tapped resistor and a fixed voltage source each in shunt relation to said main slidewire, an amplifier having an output connectable by operation of said motor cam to either of said servomotors, said amplifier having an input connected to said contact of said calibrating slidewire and being connectable by operation of said shifter cam to either said contact of said main slidewire or to a tap of said resistor, said amplifier being adapted and arranged for operation of the servomotor to which it is connected to equalize the voltages at its input, said cam system being adapted and arranged first to cause adjustment of said calibrating slidewire contact voltage from one of said channels to equal the voltage of said tap on said resistor and subsequently to cause adjustment of said main slidewire contact voltage to equal the voltage of said calibrating slidewire contact from another of said channels, a prism motor for rotating said spectroscope member, a limit switch for stopping said motor approximately at a predeterimned position of said member, a stop carried by a rotatable turret driven by said prism motor for positioning more accurately said member, and a sequence switch connected to said turret in series with said limit switch and operatively connected to said selector switch whereby selected portions of said spectrum are utilized for measuring in relation to other predetermined portions thereof.

13. In a measuring system for measuring and comparing a condition in relation to an arbitrarily selected reference condition having similar characteristics and being subject to similar measuring errors, the combination of a balanceable network including a calibration slidewire and a main slidewire, circuit-controlling means for applying to said network a signal varying in accordance with the magnitude of a condition for unbalancing said network, means responsive to the unbalance of said network for adjusting said calibration slidewire in a direction and to an extent sufficient to rebalance the network, said unbalance-responsive means being connected between the movable contact of said calibration slidewire and a fixed voltage point, and means for connecting said unbalance-responsive means between said calibration slidewire and said main slidewire for adjusting said main slidewire with respect to said calibration slidewire for equalization of the contact voltages of said slidewires, said circuit-controlling means being operable after the rebalancing of said network to apply to said network a signal varying with the magnitude of a different condition and to connect said unbalance-responsive means between said movable contact of said calibration slidewire and the movable contact of said main slidewire for adjustment of said main slidewire in a direction and to an extent sufficient to equalize the voltages at said movable contacts of said slidewire to rebalance said network thereby to provide a measurement of the magnitude of said second-named condition with respect to the magnitude of said first-named condition.

14. A measuring system comprising a balanceable network including a logarithmically tapered calibration slidewire and a main slidewire, circuit-controlling means for applying to said network a signal varying in accordance with the magnitude of an arbitrarily selected reference condition for unbalancing said network, means responsive to the unbalance of said network for adjusting said calibration slidewire in a direction and to an extent sufficient to rebalance the network, said unbalance-responsive means being connected between the movable contact of said calibration slidewire and a fixed voltage point, said circuit-controlling means being operable after the rebalancing of said network to apply to said network a signal varying with the magnitude of a different condition and to connect said unbalance-responsive means between said movable contact of said calibration slidewire and the movable contact of said main slidewire for adjustment of said main slidewire in the direction and to an extent sufficient to equalize the voltages at said movable contacts of said slidewires to rebalance said network thereby to provide a measurement of the magnitude of said second-named condition with respect to the magnitude of said first-named condition.

GEORGE L. BROOMELL, Jr.

REFERENCES CITED

The following references are of record in the file of this patent:

UNITED STATES PATENTS

| Number | Name | Date |
| --- | --- | --- |
| 2,314,800 | Pineo | Mar. 23, 1943 |
| 2,404,891 | Schmitt | July 30, 1946 |
| 2,424,146 | Caldwell et al. | July 15, 1947 |
| 2,446,153 | Belcher | July 27, 1948 |
| 2,451,572 | Moore | Oct. 19, 1948 |